(12) United States Patent
Kim et al.

(10) Patent No.: US 8,174,631 B2
(45) Date of Patent: May 8, 2012

(54) TOUCH PANEL WITH IMPROVED RELIABILITY AND DISPLAY DEVICE EMPLOYING THE TOUCH PANEL

(75) Inventors: Hyuk-jin Kim, Cheonan-si (KR);
Beom-jun Kim, Seoul (KR);
Dong-wuuk Seo, Cheonan-si (KR);
Sung-man Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1224 days.

(21) Appl. No.: 11/932,251

(22) Filed: Oct. 31, 2007

(65) Prior Publication Data
US 2008/0180400 A1 Jul. 31, 2008

(30) Foreign Application Priority Data

Jan. 25, 2007 (KR) .......................... 10-2007-0007962

(51) Int. Cl.
*G02F 1/1335* (2006.01)

(52) U.S. Cl. ......................................... 349/12; 345/173

(58) Field of Classification Search ..................... 349/12
See application file for complete search history.

(56) References Cited

U.S. PATENT DOCUMENTS 7,889,183 B2 * 2/2011 Lee et al. ..................... 345/173

FOREIGN PATENT DOCUMENTS

| JP | 2001075074 | 3/2001 |
| KR | 1020060056633 | 5/2006 |
| KR | 1020060065333 | 6/2006 |

* cited by examiner

*Primary Examiner* — Richard Kim
(74) *Attorney, Agent, or Firm* — Innovation Counsel LLP (57) ABSTRACT

A display device that is capable of reliably sensing a contact with a touch panel is presented. The device includes: a first insulating substrate; a first sensing line disposed on the first insulating substrate in a predetermined direction; a first pixel disposed on the left side of the first sensing line; a second pixel disposed on the right side of the first sensing line; a first data line disposed on the left side of the first pixel; and a second data line disposed on the right side of the second pixel. The first pixel is connected with the first data line and the second pixel is connected with the second data line.

19 Claims, 7 Drawing Sheets

TOUCH PANEL WITH IMPROVED RELIABILITY AND DISPLAY DEVICE EMPLOYING THE TOUCH PANEL

CROSS-REFERENCE TO RELATED APPLICATIONS

This application claims priority from Korean Patent Application No. 10-2007-0007962 filed on Jan. 25, 2007 in the Korean Intellectual Property Office, the disclosure of which is incorporated herein by reference.

BACKGROUND OF INVENTION

1. Field of Invention

Apparatuses of the present invention relate to a display device, and more particularly to a display device that has an inner type touch panel.

2. Description of the Related Art

Generally, a touch panel accepts user input by means of a touch by a finger or an object to select contents displayed on a screen of a display panel such as a liquid crystal display panel. The touch panel is often provided at the uppermost side of a display device. A display device with a touch panel is becoming popular because it does not need input components such as a keyboard, a mouse, etc.

An inner type touch panel, where a pressure sensing sensor to detect an external contact is not separately provided as a panel but mounted in a display panel, has been developed. In the inner type touch panel, an electrode and a spacer for sensing are formed where a pixel is formed.

The inner type touch panel has its problems. For example, if two sensing electrodes to sense X and Y positions are formed in one pixel, the aperture ratio of the pixel decreases. Further, if the spacer is provided over a thin film transistor, the display panel is shifted because of a stepped part formed below the spacer by the thin film transistor. That is, as an upper substrate is shifted against a lower substrate where the sensing electrodes are formed, it becomes unstable to sense the external stimulus when an external stimulus is applied to the stepped part.

SUMMARY OF THE INVENTION

Accordingly, it is an aspect of the present invention to provide a display device that has an improved aperture ratio and that is capable of reliably sensing an external stimulus.

Additional aspects of the present invention will be set forth in part in the description which follows and, in part, will be obvious from the description, or may be learned by practice of the present invention.

In one aspect, the present invention is a display device that includes: a first insulating substrate; a first sensing line which is disposed on the first insulating substrate in a predetermined direction; a first pixel disposed on the left side of the first sensing line; a second pixel disposed on the right side of the first sensing line; a first data line disposed on the left side of the first pixel; and a second data line disposed on the right side of the second pixel, the first pixel being connected with the first data line and the second pixel being connected with the second data line.

According to an aspect of the invention, the display device also includes a first extending part that extends from the first sensing line and a first sensing electrode connected to the first extending part. The first pixel may have a first pixel electrode and a first thin film transistor that connects the first pixel electrode to the first data line, and the second pixel may have a second pixel electrode and a second thin film transistor that connects the second pixel electrode and the second data line. The first sensing electrode may be disposed in a region where the first thin film transistor and the second thin film transistor are not disposed.

According to an aspect of the invention, the first thin film transistor may be disposed on an upper or lower left end portion of the first pixel.

According to an aspect of the invention, the second thin film transistor may be disposed on an upper or lower right end portion of the second pixel.

According to an aspect of the invention, the display device also may include a second insulating substrate that faces the first insulating substrate; a sensing spacer formed on the second insulating substrate and corresponding to the first sensing electrode; and a contact electrode formed on the sensing spacer.

According to an aspect of the invention, the display device may also include a common electrode disposed on the second insulating substrate, wherein a common voltage at a predetermined level is applied to the common electrode and the contact electrode.

According to an aspect of the invention, the display device may further include a cell gap spacer disposed on the second insulating substrate.

According to an aspect of the invention, the first pixel may have at least one storage capacity electrode having a portion that overlaps the first pixel electrode, and the second pixel may have at least one storage capacity electrode having a portion that overlaps the second pixel electrode.

According to an aspect of the invention, the display device may also include a second sensing line that intersects the first sensing line; and a second extending part that extends from the second sensing line and a second sensing electrode connected to the second extending part, wherein the first sensing electrode and the second sensing electrode may be disposed at an intersection area of the first sensing line and the second sensing line.

According to an aspect of the invention, the second sensing electrode may be formed to correspond to the sensing spacer.

According to an aspect of the invention, the first thin film transistor and the second thin film transistor are formed in corner areas of the first pixel and the second pixel where the first sensing electrode and the second sensing electrode are not formed, respectively.

According to an aspect of the invention, the display device may also include a third pixel disposed between the first sensing line and the second pixel; and an additional data line disposed between the third pixel and the second pixel to be connected with the third pixel.

According to an aspect of the invention, the display device may include a gate line that intersects the first sensing line, wherein the first sensing electrode is disposed at an intersection area of the first sensing line and the gate line.

According to an aspect of the invention, the display device may include a gate driver that applies a gate signal to the gate line according to a clock signal; and a sensing controller that determines a position of the gate line that intersects the first sensing line where a sensing signal is sensed using the clock signal of time when the sensing signal is sensed if the sensing signal corresponding to an external stimulus is sensed from the first sensing line.

According to an aspect of the invention, the display device may include a signal controller which outputs the clock signal and a vertical synchronization start signal which directs to start outputting the gate signal, wherein the sensing controller counts the clock signals from output of the vertical synchronization start signal.

In another aspect, the present invention is a display device that entails: an insulating substrate; a sensing line on the insulating substrate, the sensing line extending in a predetermined direction; a gate line that intersects the sensing line; a first pixel disposed on the left side of the sensing line; a second pixel on the right side of the sensing line; a first data line on the left side of the first pixel and connecting the first data line to the first pixel; a second data line disposed on the right side of the second pixel and connecting the second data line to the second pixel; and a sensing electrode at an intersection area of the sensing line and the gate line.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS

Reference will now be made in detail to the embodiments of the present invention, examples of which are illustrated in the accompanying drawings, wherein like reference numerals refer to like elements throughout. The embodiments are described below so as to explain the present invention by referring to the figures.

Figure 1:
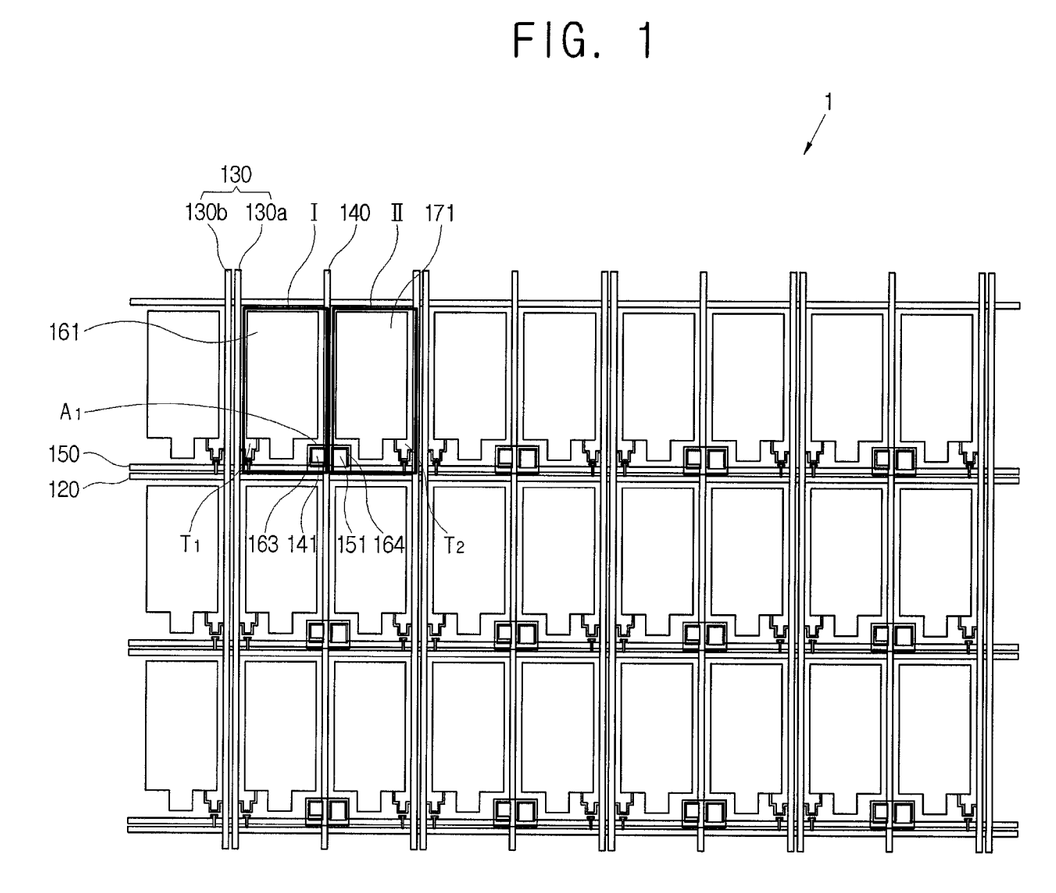
FIG. 1 is a schematic view of a display device according to a first exemplary embodiment of the present invention.

Referring to FIG. 1, a display device according to a first exemplary embodiment of the present invention has a touch-screen function and displays an image formed according to an external pressure. The display device includes sensing electrodes 163 and 164 to sense the pressure disposed in a display panel 1 in an inner type. The display panel 1 is provided as a liquid crystal display (LCD) panel which includes a liquid crystal layer (see FIG. 3).

A plurality of data line units 130, first sensing lines 140, gate lines 120 and second sensing lines 150 are formed in the display panel 1. The data lines 130 and the first sensing lines 140 extend in a first direction, and the gate lines 120 and the second sensing lines 150 extend in a second direction that is substantially perpendicular to the first direction. Pixels I and II are defined by the data line units 130, the first sensing lines 140 and the gate lines 120 in a matrix form and alternately disposed. A first sensing electrode 163 and a second sensing electrode 164 are formed at an intersection area A1 where the first sensing lines 140 and the second sensing lines 150 cross each other. The first and the second sensing electrodes 163 and 164 transmit an electric signal which is generated to correspond to an external stimulus such as pressure to the sensing lines 140 and 150. The first sensing electrode 163 is electrically connected to the first sensing lines 140 and transmits an electric signal about an X-position information of a point where a stimulus is generated to the first sensing electrodes 140. The second sensing electrode 164 is electrically connected to the second sensing lines 150 and transmits an electric signal about a Y-position information of the point where a stimulus is generated to the second sensing electrodes 150.

The pixels I and II includes a first pixel I disposed on the left side of the first sensing lines 140 and a second pixel II disposed on the right side of the first sensing lines 140. That is, the first pixel I and the second pixel II are provided symmetrically about the first sensing lines 140.

The data line unit 130 includes a first data line 130a formed on the left side of the first pixel I and connected to the first pixel I and a second data line 130b formed on the right side of the second pixel II and connected to the second pixel II. Two data lines 130a and 130b are provided at one of the boundaries between the first pixel I and the second pixel II, and the first sensing line 140 is provided at the boundary between the first pixel I and the second pixel II where the data lines units 130 are not formed.

The pixels I and II include thin film transistors T1 and T2 which are connected to the respective data lines 130a and 130b. In the present exemplary embodiment, a first thin film transistor T1 is formed on a lower left portion of the first pixel I, and a second thin film transistor T2 is formed on a lower right portion of the second pixel II. The thin film transistors T1 and T2 are formed on a region where the sensing electrodes 163 and 164 are not formed. A sensing spacer 250 is disposed over the sensing electrodes 163 and 164 to transmit an external stimulus. The sensing electrodes 163 and 164 transmit a sensed signal and extending parts 141 and 151 extending from the sensing lines 140 and 150 are formed below the sensing spacer 250.

In a conventional display device, as two sensing electrodes that sense X and Y positions are formed in one pixel, the aperture ratio of the pixel is decreased.

If only a single sensing electrode is formed in one pixel to increase the aperture ratio, a sensing spacer is formed across two pixels to contact the two sensing electrodes in the pixels. Since one pixel has a single sensing electrode, the aperture ratio is improved. However, as one sensing spacer is shared by two pixels, a thin film transistor can be formed below the sensing spacer. If the thin film transistor is formed below the sensing spacer, a stepped part is formed on a portion where the thin film transistor is disposed because of a plurality of metal and semiconductor layers.

When an external stimulus is applied to the stepped part, it is not properly transmitted to the sensing electrode and a plurality of substrates in the display panel move. In the LCD panel, an upper substrate where the sensing spacer is formed is shifted against a lower substrate where the thin film transistor is formed, and thus the structure of the panel becomes unstable.

In the present exemplary embodiment, since the first sensing electrode 163 is formed in the first pixel I and the second sensing electrode 164 is formed in the second pixel II, aperture ratios of the pixels I and II do not decrease much. Further, as the first sensing line 140 are separated from the data lines 130a and 130b with the pixels I and II disposed therebetween and the thin film transistors T1 and T2 are formed adjacently to the data lines 130a and 130b, i.e., the sensing electrodes 163 and 164 and the thin film transistors T1 and T2 are formed in different areas, a stepped part is not formed below the sensing spacer 250. Accordingly, a sensed signal is accurately transmitted and the display panel 1 is not shifted by an external stimulus.

The shape and a size of the sensing electrodes 163 and 164 may be modified in various ways depending on the shapes and aperture ratios of the pixels I and II. The sensing electrodes 163 and 164 may be designed to be several tens nm by several tens nm in area. More particularly, the sensing electrodes 163 and 164 have an area of 15 nm by 15 nm at least.

Figure 2:
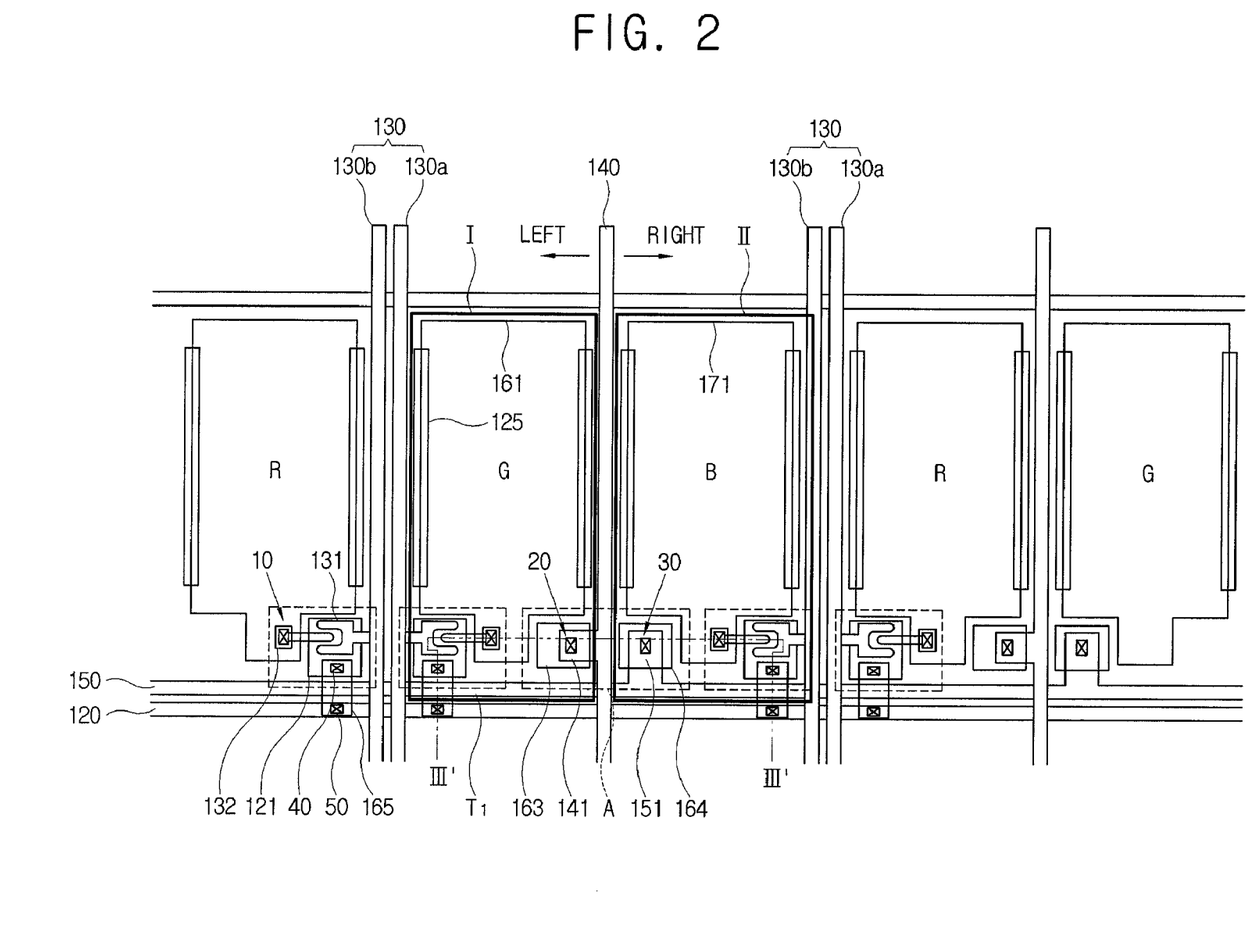
FIG. 2 is a detailed view of a pixel in the display device according to the first exemplary embodiment of the present invention.
Figure 3:
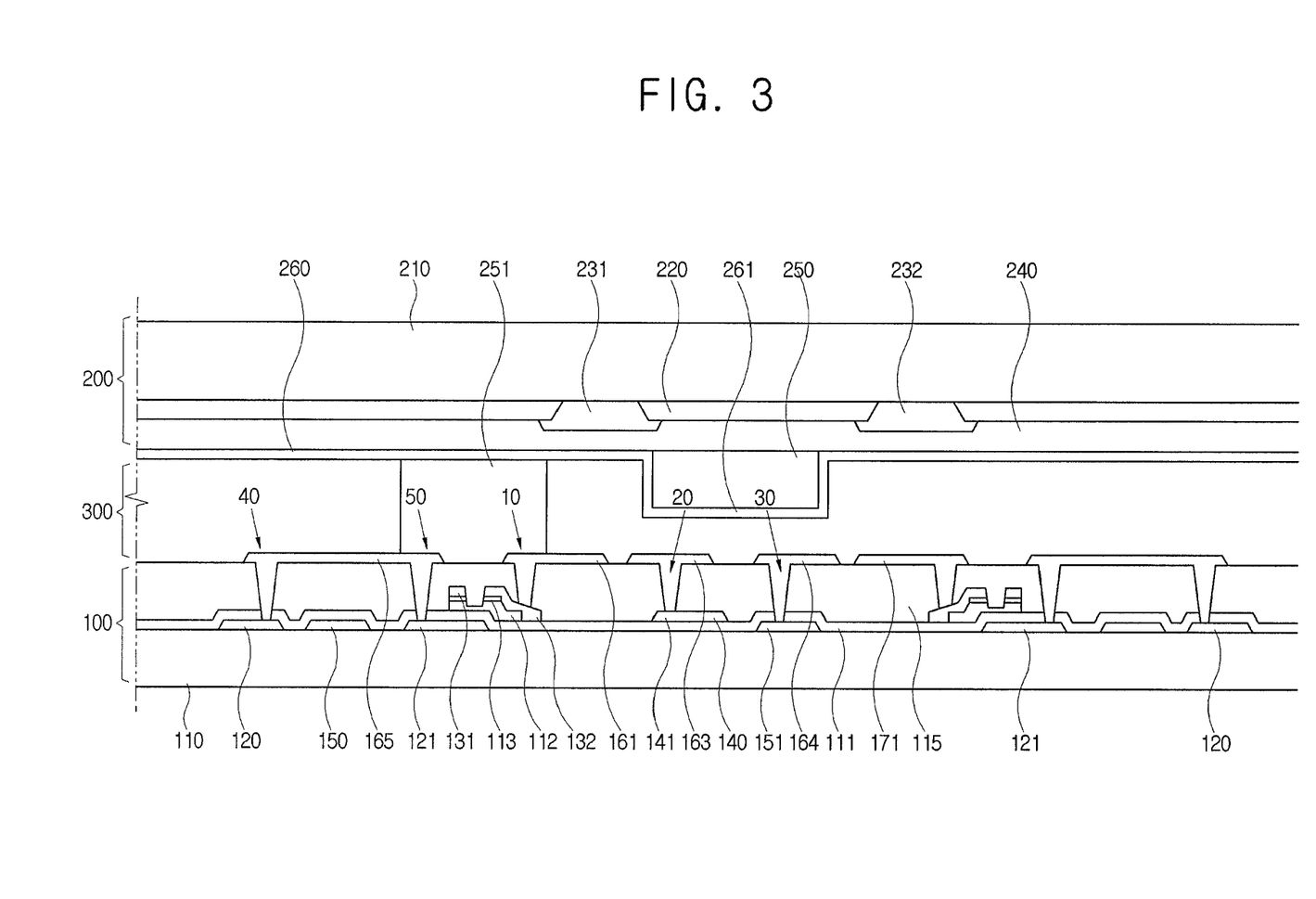
FIG. 3 is a cross-sectional view taken along line III-III in FIG. 2.

FIG. 2 illustrates a pixel in detail; and FIG. 3 is a cross-sectional view taken along the line III-III in FIG. 2. Referring to FIGS. 2 and 3, a pixel according to the present exemplary embodiment of the present invention will be described in detail.

The display device according to the present exemplary embodiment includes a first substrate 100 where a plurality of pixels I and II are formed, a second substrate 200 which faces the first substrate 100, and a liquid crystal layer 300 interposed between the substrates 100 and 200. Respective color filters 231 and 232 of different colors are formed in the pixels I and II. Red, green and blue color filters are alternately repeated in the first and the second pixels I and II. In the present exemplary embodiment, red, green and blue pixels are disposed two times while the first pixel I and the second pixel II are alternately disposed three times.

Provided that one dot, which is a unit for representing an image, includes red, green and blue pixels, the repetition of two dots in the present exemplary embodiment is referred to as "two-dot symmetry." Dot symmetry may determine a unit where a polarity of a data signal changes in an inversion method employed for a driving of the LCD panel. That is, the polarity of the data signal may change every two dots. In this case, six pixels I and II disposed along an extending direction of the gate line 120 are applied with a data signal of the same polarity during one frame.

In detail, a gate wiring 120, 121, 125, 150 and 151 are formed on a first insulating substrate 110. The gate wiring 120, 121, 125, 150 and 151 may be a single metal layer or a metal multilayer. The gate wiring 120, 121, 125, 150 and 151 includes the gate line 120 extending in the second direction, a gate electrode 121 connected to the gate line 120, a storage capacity electrode 125 extending parallel with the data lines 130a and 130b, the second sensing line 150 formed parallel with the gate line 120, and the second extending part 151 extending from the second sensing line 150.

The gate line 120 and the second sensing line 150 are formed parallel to each other in the embodiment shown. However, this is not a limitation of the invention and the gate line 120 and the second sensing line 150 may be disposed in various patterns (such as zigzags) or may not be formed parallel to each other.

The storage capacity electrode 125 extends along a long side of the pixels I and II, i.e., along the data lines 130a and 130b, and at least a portion of it overlaps the pixel electrodes 161 and 171. The storage capacity electrode 125 forms a storage capacity by overlapping the pixel electrodes 161 and 171 and reduces a difference between parasitic capacities Cdp generated between the pixel electrodes 161, 171 and the data lines 130a, 130b.

If the data lines 130a and 130b for applying data signals to the pixel electrodes 161 and 171 were asymmetrically disposed in the pixels I and II, parasitic capacities Cdp between the pixel electrodes 161 and 171 and the data lines 130a and 130b would be different in the pixels I and II, thereby generating a vertical stripe on the display panel 1. The storage capacity electrode 125 is provided to reduce the parasitic capacities Cdp to decrease the vertical stripe.

In order to decrease the difference between the respective parasitic capacities Cdp generated between the pixel electrodes 161 and 171 and the data lines 130a and 130b, the gap between the pixel electrodes 161 and 171 and the data lines 130a and 130b may be increased. Also, the parasitic capacities Cdp is reduced by exposing a photoresist material in the direction in which the gate line 120 extends (not in the direction in which the data lines 130a and 130b extend) during a photolithography process for the forming of the wiring.

The second sensing line 150 is provided as a passage where an electric signal is transmitted and supplies a position information about where on the second sensing electrode 164 the pressure was applied. The second extending part 151 extends from the sensing line 150 toward the second pixel II so that an electric signal generated in the second sensing electrode 164 is easily transmitted to the second sensing line 150 and is physically in contact with the second sensing electrode 164.

A gate insulating layer 111 is made of silicon nitride (SiNx) or the like and formed on the first insulating substrate 110 to cover the gate wiring 120, 121, 125, 150 and 151.

A semiconductor layer 112 made of amorphous silicon is formed on the gate insulating layer 111 over the gate electrode 121. An ohmic contact layer 113 made of n+ hydrogenated amorphous silicon highly doped with n-type impurities is formed on the semiconductor layer 112.

A data wiring 130, 131, 132, 140 and 141 is formed on the ohmic contact layer 113 and the gate insulating layer 111. The data wiring 130, 131, 132, 140 and 141 may be a metal single layer or a metal multilayer.

The data wiring 130, 131, 132, 140 and 141 includes a data line unit 130 which extends perpendicularly to the gate line 120 to form a pixel, a source electrode 131, a drain electrode 132, the first sensing line 140 which is formed parallel to the data line unit 130 and intersects the second sensing line 150, and the first extending part 141 which extends from the first sensing line 140 and is formed on a position where the first sensing electrode 163 is to be disposed.

As described above, the data line unit 130 includes the first data line 130a and the second data line 130b that extend parallel to each other between the first pixel I and the second pixel II. The data line unit 130 is repeatedly formed every two pixels I and II.

The source electrode 131 branches from the data line 130, and the drain electrode 132 connects to the pixel electrodes 161 and 171 through the contact hole 10. The source electrode 131 in the first pixel I extends to the right side of the first data line 130a in order to connect the first pixel electrode 161, which is to be formed on the right side of the first data line 130a, to the first data line 130a. The source electrode 131 in the second pixel II extends to the left side of the second data line 130b in order to connect the second electrode 171, which is to be formed on the left side of the second data line 130b, to the second data line 130b.

An electric signal generated by pressing the first sensing electrode 163 is transmitted through the first sensing line 140. The first extending part 141 extends in a direction from the first sensing line 140 to the first pixel I so that an electric signal generated in the first sensing electrode 163 is easily transmitted to the first sensing line 140. The first extending part 141 is in contact with the first sensing electrode 163. A passivation layer 115 is formed on the data wiring 130, 131, 132, 140 and 141 and a portion of the semiconductor layer 112 which is not covered with the data wiring 130, 131, 132, 140 and 141. Contact holes 10, 20, 30, 40 and 50 are formed in the passivation layer 115 and extend down to the drain electrode 132, the first extending part 141, the second extending part 151, the gate line 120 and the gate electrode 121, respectively.

The pixel electrodes 161 and 171, the first sensing electrode 163, the second sensing electrode 164 and a bridge electrode 165 connecting the gate line 120 and the gate electrode 121 are formed on the passivation layer 115.

The pixel electrodes 161 and 171 includes the first pixel electrode 161 forming the first pixel I and the second pixel electrode 171 forming the second pixel II. The pixel electrodes 161 and 171 are generally made of a transparent conductive material such as indium tin oxide (ITO) or indium zinc oxide (IZO). The first and the second pixel electrodes 161 and 171 have a rectangular shape. The thin film transistors T1 and T2 are formed on one lower corner area of the rectangle, and the sensing electrodes 163 and 164 are formed on another lower corner area of the rectangle. The first and the second pixel electrodes 161 and 171 have substantially the same area.

The first pixel electrode 161 and the second pixel electrode 171 are formed symmetrically on the first sensing line 140. The first sensing electrode 163 is disposed toward the first pixel I at the intersection area A of the first sensing line 140 and the second sensing line 150, and the second sensing electrode 164 is disposed toward the second pixel II at the intersection area A. The first sensing electrode 163 and the second sensing electrode 164 are formed in areas where the first and the second thin film transistors T1 and T2 are not formed.

A contact electrode 261 comes in contact with the first and the second sensing electrodes 163 and 164 when the external stimulus is generated. Here, the first and the second sensing electrodes 163 and 164 may have enough area to easily contact the contact electrode 261. Thus, the total area of the first and the second sensing electrodes 163 and 164 may be at least the same as or larger than the area of the contact electrode 261. Here, the areas of the first and the second sensing electrodes 163 and 164 may be larger as long as they do not affect the aperture ratio. The first and the second sensing electrodes 163 and 164 may have the same or different areas.

Referring to FIG. 3, a metal layer corresponding to the extending parts 141 and 151, the gate insulating layer 111 and the passivation layer 115 are commonly disposed below the sensing electrodes 163 and 164. Accordingly, the first and the second sensing electrodes 163 and 164 have the same height as measured from the first insulating substrate 110 and do not have a stepped part. Thus, when the first and the second sensing electrodes 163 and 164 are applied with an external pressure at the same time, their sensitivity to the external pressure are improved compared to devices that have a stepped part.

The bridge electrode 165 connects the gate line 120 and the gate electrode 121 that are separated by the second sensing line 150 disposed between them and is formed in the same layer as the pixel electrodes 161 and 171.

In other exemplary embodiments, the first thin film transistor T1 may be formed on an upper end portion of the first pixel electrode 161 as long as it does not overlap the first sensing electrode 163, and the second thin film transistor T2 may be formed on another corner area of the second pixel electrode 171 as long as it does not overlap the second sensing electrode 164. That is, the first and the second thin film transistors T1 and T2 may be formed anywhere the sensing spacer 250 is not formed.

Alternatively, the first extending part 141 may extend (right) from the first sensing line 140 to the second pixel II, and the second extending part 151 may extend (left) in a direction to the first pixel I.

Next, the second substrate 200 will be described.

A black matrix 220 is formed on a second insulating substrate 210. The black matrix 220 is disposed between the red, the green and the blue filters to divide the filters, and prevents light from shining directly on the thin film transistors T1 and T2 disposed on the first substrate 100. The black matrix 220 is typically made of a photoresist organic material including a black pigment. The black pigment may be carbon black, titanium oxide or the like. Further, the black matrix 220 may include a metal material such as chrome oxide.

A color filter layers 231 and 232 with filters of different colors is formed on the second insulating substrate 210. The color filter layers 231 and 232 include a red, a green and a blue filters which are alternately disposed and separated by the black matrix 220. The color filter layers 231 and 232 endow colors to the light from the backlight unit (not shown) and passing through the liquid crystal layer 300. The color filter layers 231 and 232 are generally made of a photoresist organic material. The color filter layers 231 and 232 may be formed on the first substrate 100 or be omitted depending on a driving method of the backlight unit.

An overcoat layer 240 is formed on the black matrix 220 and the color filter layers 231 and 232. The overcoat layer 240 provides a planar surface and protects the color filter layers 231 and 232. The overcoat layer 240 is made of an acrylic epoxy material.

The sensing spacer 250 is formed on the overcoat layer 240 to transmit a stimulus. The sensing electrodes 163 and 164 are formed below the sensing spacer 250 on the first substrate 100.

When the user gives a stimulus to an upper part of the second substrate 200, the sensing spacer 250 transmits the stimulus to the first substrate 100. In the present exemplary embodiment, the sensing spacer 250 is formed to cover both the first and the second sensing electrodes 163 and 164. In other words, when a stimulus is given from the outside, the sensing spacer 250 comes in contact with both the first and the second sensing electrodes 163 and 164, thereby improving sensitivity to the stimulus.

Further, as the first and the second sensing electrodes 163 and 164 are formed with the same height, the second substrate 200 is not shifted against the first substrate 100 when the sensing spacer 250 is given pressure.

A common electrode 260 is formed on the overcoat layer 240, and the contact electrode 261 is formed on the sensing spacer 250. The common electrode 260 and the contact electrode 261 are formed in the same layer and supplied with a predetermined level of common voltage. The common electrode 260 is made of a transparent conductive material such as ITO or IZO. The common electrode 260 and the contact electrode 261 are formed in the same layer by the same process where a conductive material is deposited throughout the second insulating substrate 210. The common electrode 260 applies a voltage directly to the liquid crystal layer 300 along with the pixel electrodes 161 and 171 of the first substrate 100.

When a stimulus is given to the sensing electrodes 163 and 164 from the outside, the contact electrode 261 applied with a common voltage comes in contact with the sensing electrodes 163 and 164 and the common voltage is transmitted to the outside through the sensing electrodes 163 and 164 and the sensing lines 140 and 150.

The cell gap spacer 251 is formed on the common electrode 260, and the thin film transistors T1 and T2 are formed to face the cell gap spacer 251. The cell gap spacer 251 is provided to keep the first substrate 100 spaced from the second substrate 200 at a regular distance. The liquid crystals are injected to a space formed by the substrates 100 and 200. In the present exemplary embodiment, the cell gap spacer 251 and the sensing spacer 250 are formed in different layers by separate processes.

In other exemplary embodiments, the cell gap spacer 251 may be formed between the overcoat layer 240 and the common electrode 260 as well as the sensing spacer 250. In these embodiments, there would be no common electrode 260 formed on the cell gap spacer 251.

In yet other exemplary embodiments, the common electrode 260 and the contact electrode 261 may be formed by separate processes in different layers.

The liquid crystal layer 300 which includes liquid crystal molecules is disposed between the first substrate 100 and the second substrate 200.

Figure 4:
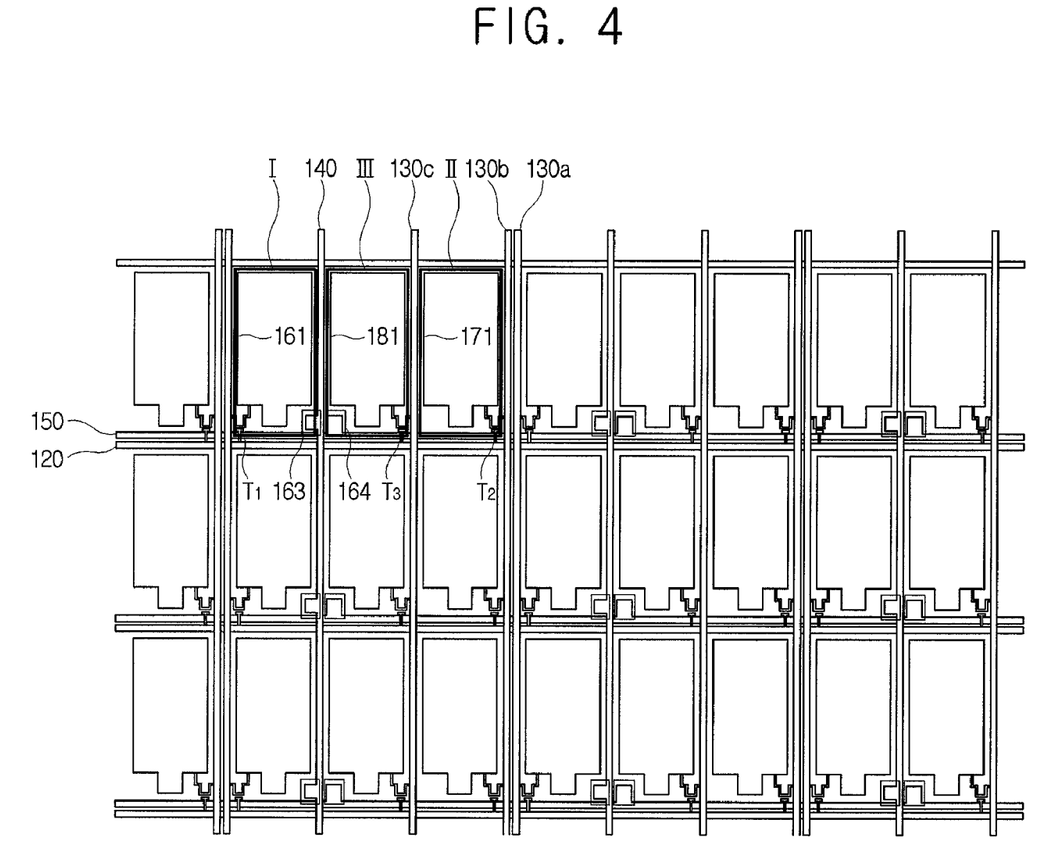
FIG. 4 is a schematic view of a display device according to a second exemplary embodiment of the present invention.

FIG. 4 is a schematic view of a display device according to a second exemplary embodiment of the present invention.

The display device according to the second exemplary embodiment further includes a third data line 130c and a third pixel III. The third data line 130c is disposed between a first sensing line 140 and a second data line 130b. The third pixel III includes a third pixel electrode 181 and a third thin film transistor T3 which connects the third pixel electrode 181 to the third data line 130c.

The third thin film transistor T3 is formed on a lower right end portion of the third pixel electrode 181, and a second extending part 151 extends in a direction from a second sensing line 150 to the third pixel III. In other words, first and second sensing electrodes 163 and 164 are formed at an intersection area A of the sensing lines 140 and 150 between a first pixel I and the third pixel III, and thin film transistors T1, T2 and T3 are formed on a corner where the sensing electrodes 163 and 164 are not formed.

The present exemplary embodiment differs from the first exemplary embodiment in that one dot is successively repeated. That is, one dot including the first, the second and the third pixels I, II and III is repeated in a one-dot symmetry. Thus, an image may be displayed by two-dot inversion or one-dot inversion where a polarity of a data signal may change every one dot.

Figure 5:
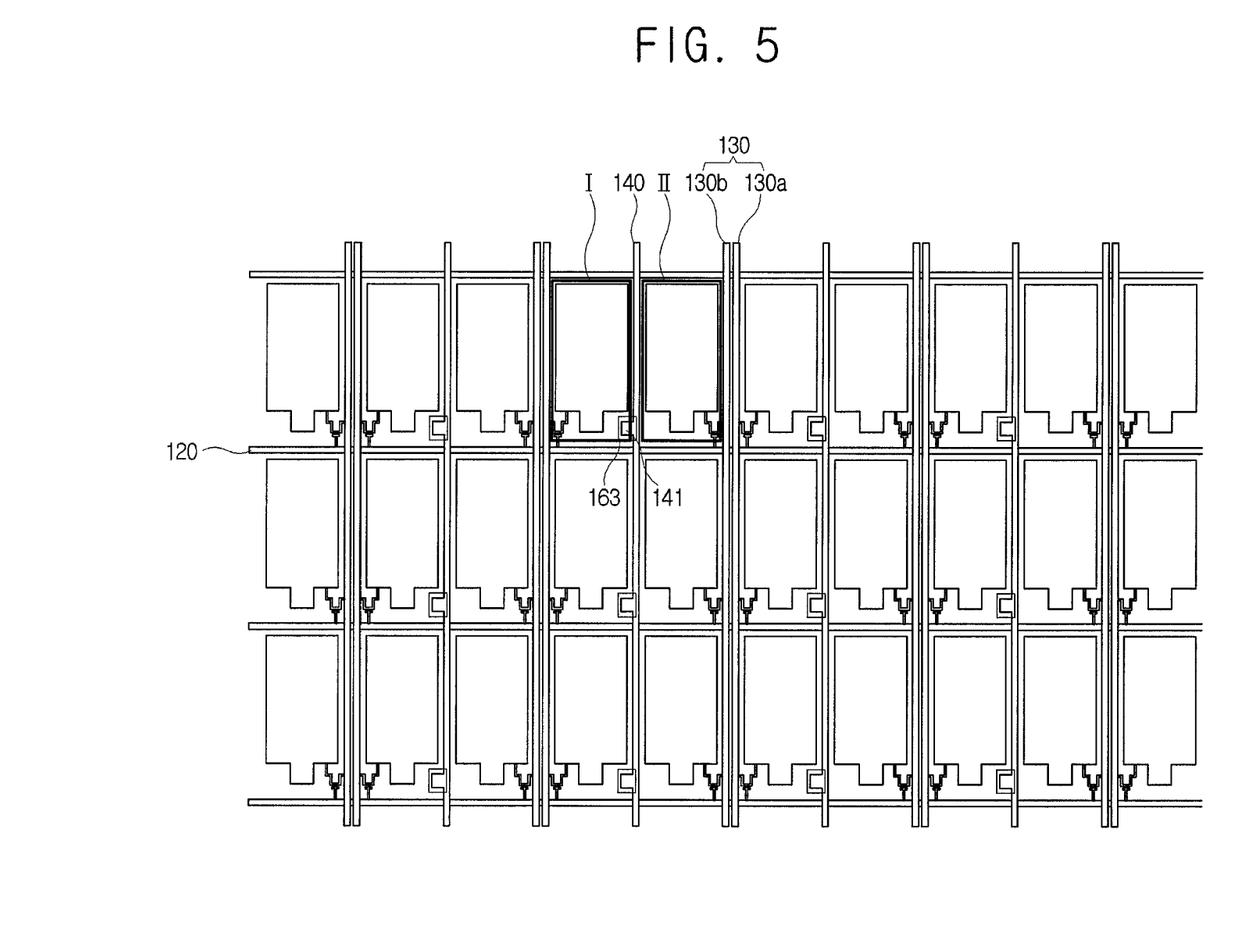
FIG. 5 is a schematic view of a display device according to a third exemplary embodiment of the present invention.
Figure 6:
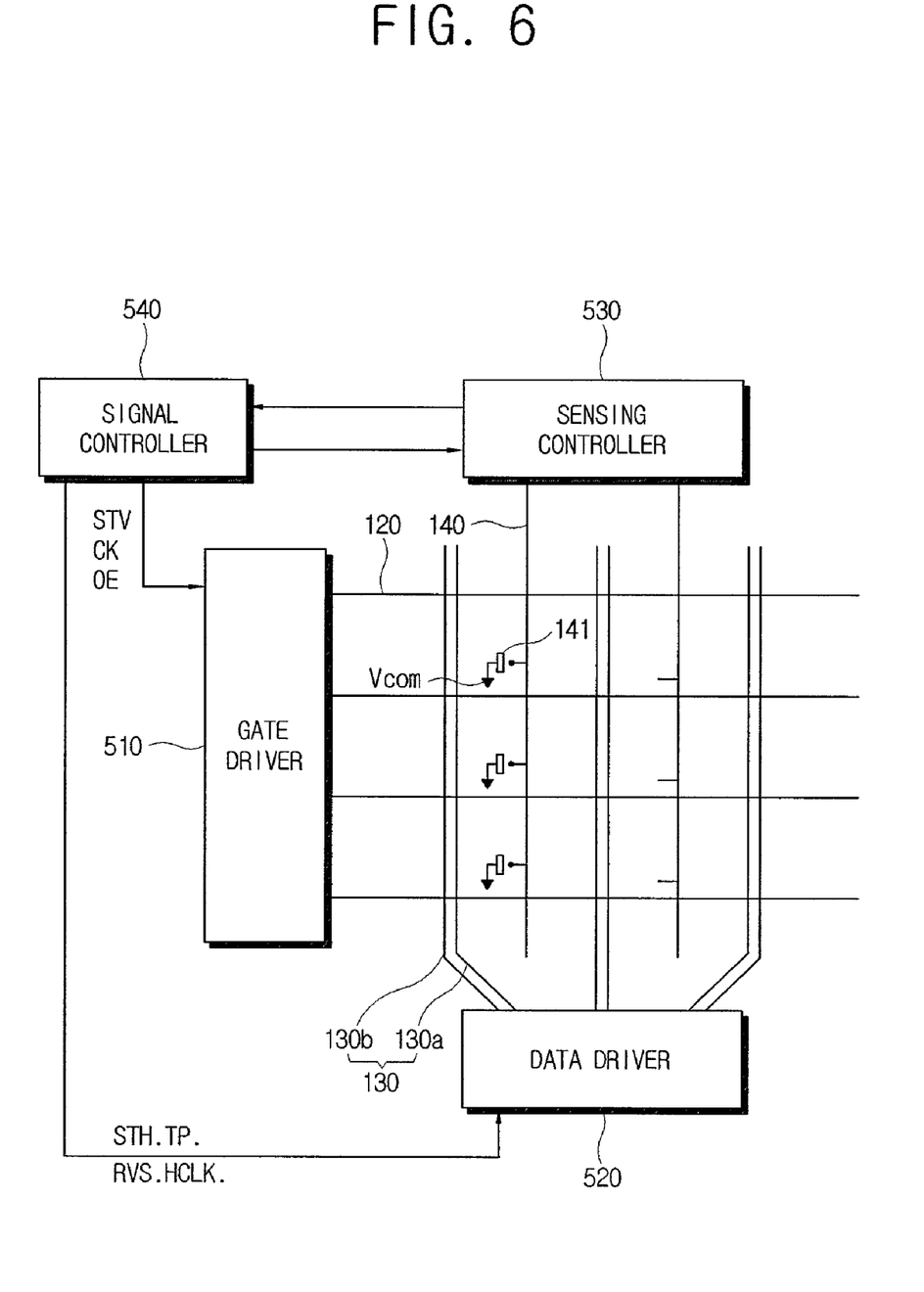
FIG. 6 is a control block diagram of the display device according to the third exemplary embodiment of the present invention.

FIG. 5 is a schematic view of a display device according to a third exemplary embodiment of the present invention. FIG. 6 is a control block diagram of the display device according to the third exemplary embodiment of the present invention.

Unlike the display device in the foregoing exemplary embodiments, the display device according to the present exemplary embodiment does not include the second sensing line 150 disposed parallel to a gate line 120 or the second sensing electrode 164.

A first sensing electrode 163 is formed at an intersection area of the gate line 120 and a first sensing line 140 and determines an X and a Y positions about where a stimulus is generated using an electric signal transmitted from the first sensing electrode 163. Except for the aforementioned distinctive feature, the display device has a similar configuration in wiring to that in the first exemplary embodiment, and thus descriptions thereof will not be repeated.

Referring to FIG. 6, the display device includes a gate driver 510 connected to the gate line 120, a data driver 520 connected to a data line unit 130, a sensing controller 530 connected to the first sensing line 140, and a signal controller 540 which controls these components.

The signal controller 540 is provided with an image signal and a control input signal to control the display of the image signal, e.g., a vertical synchronizing signal Vsync, a horizontal synchronizing signal Hsync, a main clock CLK, a data enable signal DE, etc., from an external graphic controller. The signal controller 540 generates a gate control signal, a data control signal, etc. based on the control input signal and outputs them to the gate driver 510, the data driver 520, etc.

The gate control signal includes a vertical synchronization start signal STV which directs the start of outputting a gate-on signal (a high level range of a gate signal), a clock signal CK that controls an output time of the gate on signal, a gate on enable signal OE that determines the width of the gate-on signal, and the like. The data control signal includes a horizontal synchronization start signal STH which indicates the start of inputting a gray scale signal, a load signal LOAD or TP that indicates to apply a data signal to data lines 130a and 130b, a reverse control signal RVS to change a polarity of a data signal, a data clock signal HCLK, and the like.

The gate driver 510 is referred to as a scan driver and is connected to the gate line 120 to apply a gate signal which consists of a combination of a gate on voltage Von and a gate off voltage Voff. The gate driver 510 outputs the gate signal according to a control signal, such as the vertical synchronization start signal STV and the clock signal CK from the signal controller 540.

The data driver 520 is also referred to as a source driver. The data driver 520 receives a gray scale voltage from a gray scale voltage generating part (not shown), selects a gray scale voltage according to external control, and applies a data voltage to the data lines 130a and 130b.

The sensing controller 530 checks whether an electric signal is transmitted from a display panel and determines a position where an external stimulus is given.

Here, the sensing controller 530 determines the X position through a sensing signal transmitted from the first sensing line 140 and the Y position according to a clock signal at a time when the sensing signal is sensed. The sensing controller 520 converts an analog signal transmitted from the signal controller 540 into a digital signal and determines a position corresponding to an external stimulus on the basis of a clock signal output from the signal controller 540 and the digital signal.

In detail, the sensing controller 530 counts the clock signal since the output of a vertical synchronization start signal from the signal controller 540 and determines which gate line 120 is to receive the gate-on voltage at the time the digital signal is generated.

That is, the sensing controller 530 determines the position of the gate line 120 that is arranged parallel to the second sensing line to obtain the Y position information about where the stimulus is generated. The sensing controller 530 may generate a pulse when an electric signal is generated from the first sensing line 140 and count the clock signal from the output of the vertical synchronization start signal to the generation of the pulse.

Figure 7:
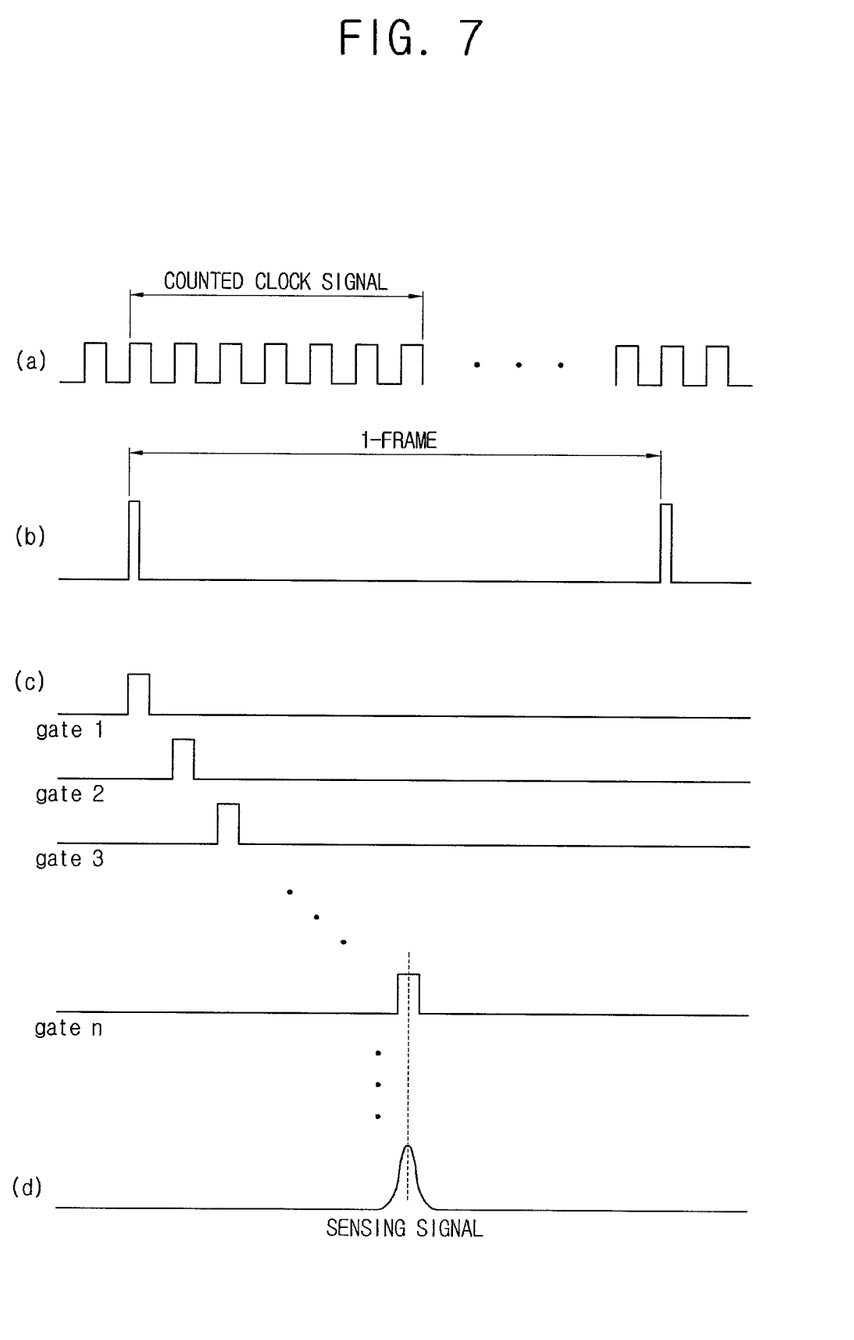
FIG. 7 illustrates a waveform of a signal to explain a sensing method of the display device according to the third exemplary embodiment.

FIGS. 7(a)-7(d) illustrate the waveforms of signals to explain a sensing method of the display device according to the third exemplary embodiment. FIG. 7(a) illustrates a clock signal, and FIG. 7(b) illustrates a vertical synchronization start signal which is output every frame. A gate line 120 is sequentially supplied with a gate-on voltage according to the clock signal of FIG. 7(a) during one frame, and a data signal is transmitted to a thin film transistor according to the gate on voltage.

As illustrated in FIG. 7(d), if a sensing signal is sensed from the first sensing line 140, the sensing controller 530 determines which gate line 120, e.g., a $n^{th}$ gate line 120, is supplied with the gate-on voltage at the time when the sensing signal is sensed, thereby obtaining the Y position information about where the stimulus is generated.

According to the present exemplary embodiment, the Y position information about where the stimulus is generated is obtained without forming the second sensing line and the second sensing electrode, thereby simplifying the process. Further, since one signal is transmitted when a stimulus is generated, the reaction time to the stimulus short.

As described above, the present invention provides a display device which has an improved aperture ratio and stably senses an external stimulus.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display device comprising:
   a first insulating substrate;
   a first sensing line which is disposed on the first insulating substrate in a predetermined direction;
   a first pixel disposed on the left side of the first sensing line;
   a second pixel disposed on the right side of the first sensing line;
   a first data line disposed on the left side of the first pixel; and
   a second data line disposed on the right side of the second pixel; and
   a first sensing electrode connected with the first sensing line and disposed at the first pixel,
   the first pixel being connected with the first data line and the second pixel being connected with the second data line.

2. The display device according to claim 1, further comprising:
   a first extending part that extends from the first sensing line, wherein
   the first sensing electrode is connected to the first extending part, and
   the first pixel comprises a first pixel electrode and a first thin film transistor that connects the first pixel electrode to the first data line, the second pixel comprises a second pixel electrode and a second thin film transistor that connects the second pixel electrode to the second data line, and the first sensing electrode is disposed in a region where the first thin film transistor and the second thin film transistor are not disposed.

3. The display device according to claim 2, wherein the first thin film transistor is disposed on an upper or lower left end portion of the first pixel.

4. The display device according to claim 2, wherein the second thin film transistor is disposed on an upper or lower right end portion of the second pixel.

5. The display device according to claim 4, further comprising a cell gap spacer disposed on the second insulating substrate.

6. The display device according to claim 2, further comprising:
   a second insulating substrate that faces the first insulating substrate;
   a sensing spacer formed on the second insulating substrate and corresponding to the first sensing electrode; and
   a contact electrode formed on the sensing spacer.

7. The display device according to claim 6, further comprising a common electrode disposed on the second insulating substrate, wherein a common voltage at a predetermined level is applied to the common electrode and the contact electrode.

8. The display device according to claim 6, further comprising:
   a second sensing line that intersects the first sensing line; and
   a second extending part that extends from the second sensing line and a second sensing electrode connected to the second extending part, wherein the first sensing electrode and the second sensing electrode are disposed at an intersection area of the first sensing line and the second sensing line.

9. The display device according to claim 8, wherein the second sensing electrode is formed to correspond to the sensing spacer.

10. The display device according to claim 8, wherein the first thin film transistor and the second thin film transistor are formed in corner areas of the first pixel and the second pixel where the first sensing electrode and the second sensing electrode are not formed, respectively.

11. The display device according to claim 2, wherein the first pixel comprises at least one storage capacity electrode having a portion that overlaps the first pixel electrode, and wherein the second pixel comprises at least one storage capacity electrode having a portion that overlaps with the second pixel electrode.

12. The display device according to claim 2, further comprising a gate line that intersects the first sensing line, wherein the first sensing electrode is disposed at an intersection area of the first sensing line and the gate line.

13. The display device according to claim 12, further comprising a gate driver that applies a gate signal to the gate line according to a clock signal; and a sensing controller that determines a position of the gate line which intersects the first sensing line where a sensing signal is sensed using the clock signal of time when the sensing signal is sensed if the sensing signal corresponding to an external stimulus is sensed from the first sensing line.

14. The display device according to claim 13, further comprising a signal controller that outputs the clock signal and a vertical synchronization start signal that directs the start of outputting the gate signal, wherein the sensing controller counts clock signals from output of the vertical synchronization start signal.

15. The display device according to claim 1, further comprising:
   a third pixel disposed between the first sensing line and the second pixel; and
   an additional data line disposed between the third pixel and the second pixel to be connected with the third pixel.

16. A display device comprising:
   an insulating substrate;
   a sensing line on the insulating substrate, the sensing line extending in a predetermined direction;
   a gate line that intersects the sensing line;
   a first pixel on the left side of the sensing line;
   a second pixel on the right side of the sensing line;
   a first data line on the left side of the first pixel and connecting the first data line to the first pixel;
   a second data line on the right side of the second pixel and connecting the second data line to the second pixel; and
   a sensing electrode connected with the sensing line and disposed at the first pixel and at an intersection area of the sensing line and the gate line.

17. The display device according to claim 16, further comprising a sensing controller that determines a position of the gate line that intersects the sensing line if a sensing signal corresponding to an external stimulus is sensed from the sensing line.

18. The display device according to claim 17, further comprising a gate driver that applies a gate signal to the gate line according to a clock signal, wherein the sensing controller determines the position of the gate line on the basis of the clock signal of time when the sensing signal is sensed.

19. The display device according to claim 17, further comprising a signal controller that outputs a clock signal and a vertical synchronization start signal to start outputting the gate signal, wherein the sensing controller counts the clock signals from output of the vertical synchronization start signal.

* * * * *